United States Patent [19]

Wang et al.

[11] Patent Number: 5,296,306

[45] Date of Patent: * Mar. 22, 1994

[54] FLAME RETARDANT BROMINATED STYRENE GRAFT LATEX COATINGS

[75] Inventors: Jin-liang Wang; Nicolai A. Favstritsky, both of Lafayette; Richard S. Rose, West Lafayette, all of Ind.

[73] Assignee: Great Lakes Chemical Corp., W. Lafayette, Ind.

[*] Notice: The portion of the term of this patent subsequent to Mar. 31, 2009 has been disclaimed.

[21] Appl. No.: 977,911

[22] Filed: Nov. 18, 1992

[51] Int. Cl.$^5$ ............................................. B32B 27/30
[52] U.S. Cl. .................................... 428/522; 428/523
[58] Field of Search ............... 428/522, 523; 524/533, 524/272, 273

[56] References Cited

U.S. PATENT DOCUMENTS

| | | | |
|---|---|---|---|
| 3,072,588 | 1/1963 | Vitkuske et al. | 260/29.6 |
| 3,766,189 | 10/1973 | Blackford | 260/285 |
| 3,877,974 | 4/1975 | Mischutin | 428/290 |
| 3,959,398 | 5/1976 | Jalics | 260/650 |
| 4,028,486 | 6/1977 | Jalics | 526/293 |
| 4,224,217 | 9/1980 | Dennis et al. | 260/45.7 |
| 4,279,808 | 7/1981 | Hornbaker et al. | 260/45.75 |
| 4,292,453 | 9/1981 | Daren et al. | 570/193 |
| 4,412,051 | 10/1983 | de Man et al. | 526/293 |
| 5,036,129 | 7/1991 | Atwell et al. | 524/278 |
| 5,066,752 | 11/1991 | Favstritsky et al. | 526/293 |
| 5,100,986 | 3/1992 | Favstritsky et al. | 526/293 |

FOREIGN PATENT DOCUMENTS 0013052 9/1980 European Pat. Off. .
2125956 12/1971 Fed. Rep. of Germany .
56-120754 2/1980 Japan .

OTHER PUBLICATIONS

Database Chemical Abstracts (Host:STN), No. 83(26): 206972r, Columbus, Ohio, U.S., copyright American Chemical Society; & JP-A-50 065 552 (Daiichi Kogyo Seiyaku Co. Ltd.; Nippon Steel Chemical Co. Ltd.) Mar. 6, 1975.

Plasdoc—Central Patents Index—Basic Abstracts Journal, Aug. 3, 1988, London GB, Section A, week 8823, A0596, No. 88-158531/23 & JP-A-63099363 (Dainippon Ink Chem KK) (Apr. 30, 1988).

World Patents Index Latest Section Ch, Week 8834, Derwent Publications Ltd., London, GB; Class A, AN 88-240258 & JP-A-63175151 (Dainippon Ink Chem KK) Jul. 19, 1988.

Primary Examiner—Joseph L. Schofer
Assistant Examiner—Jeffrey T. Smith
Attorney, Agent, or Firm—Woodard, Emhardt, Naughton, Moriarty & McNett

[57] ABSTRACT

Flame retardant latex coatings are disclosed which include natural or synthetic latex grafted with ring-halogenated, ethylenically unsaturated aromatic monomers. The grafted latex is used alone or in combination with non-grafted natural or synthetic latex. The coatings are useful for a wide variety of applications, including fabric backcoatings, carpetings, paints, adhesives, sealants, caulks, non-woven binders and so on.

34 Claims, No Drawings

FLAME RETARDANT BROMINATED STYRENE GRAFT LATEX COATINGS

BACKGROUND OF THE INVENTION

1. Field of the Invention

This invention relates to the use of latex compositions as coatings, including backcoatings, sealants, adhesives and the like, and particularly to coatings prepared from ring-halogenated, ethylenically unsaturated aromatic monomers grafted to at least one latex.

2. Description of the Prior Art

Natural and synthetic latices are commercially used in a variety of coatings. In many coatings applications, the latices used are desired to have flame-retarding properties. This applies in particular where latices are used in textiles, carpeting, paints, clear coatings, adhesives, sealants, caulking, non-woven binders and so on.

The usual method by which flame-retardant properties are imparted to latices is the blending-in of flame retardant additives. Many of these flame retardant additives contain bromine, such as brominated diphenyl or diphenyloxide compounds, together with antimony trioxide. However, such flame retardant additives have a major disadvantage in that their use gives rise to problems, such as the generation of strong white pigmenting and settling out effect, and toxicity resulting from the presence of antimony trioxide.

There has remained a need for polymer latex coatings which possess desired flame retardant properties. The coatings of the present invention satisfy this need, and provide fire-retardant latices useful in fabric backcoatings, paints, adhesives, sealants, caulking, non-woven binders and a variety of other applications.

SUMMARY OF THE INVENTION

In accordance with the present invention, there are provided latex coatings prepared by grafting of ring-halogenated ethylenically unsaturated aromatic monomers to natural or synthetic latices. Typically, the halogenated aromatic monomers are introduced in an amount to provide 6 to 36 weight percent bromine in the final latex coating. In another aspect, the halogenated aromatic monomers include polybrominated monomers, particularly to provide monomers having an average of at least 1.5 bromines per monomer unit.

The present invention is exemplified not only by grafting of ring-halogenated ethylenically unsaturated aromatic monomers to one or more natural and/or synthetic latices, but the mixture of such grafted latices with additional natural and/or synthetic latices. The resultant graft latices contain a graft latex and a homopolymer latex of brominated monomeric units.

It is an object of the present invention to provide flame retardant polymer latex coatings which have desirable physical properties.

A further object of the present invention is to provide flame retardant latex coatings which are useful for a wide variety of applications, including fabric backcoatings, paints, adhesives, sealants, caulking, non-woven binders and the like.

Further objects and advantages of the present invention will be apparent from the description which follows.

DESCRIPTION OF THE PREFERRED EMBODIMENT

For the purposes of promoting an understanding of the principles of the invention, reference will now be made to the embodiments described hereafter. It will nevertheless be understood that no limitation of the scope of the invention is thereby intended, such alterations, further modifications and applications of the principles of the invention as described herein being contemplated as would normally occur to one skilled in the art to which the invention relates.

The present invention provides polymer latex coatings having advantageous physical properties making them useful in a wide variety of applications, and which coatings have improved flame retardancy over prior art coatings. Past efforts have failed to provide coatings of the described type, while it has now been discovered that the grafting of ring-brominated aromatic monomer units to polymer latices yields coatings which provide improved flame retardancy without deleterious effects to other physical attributes of the coatings.

One, two or more latices may be reacted with, for example, brominated styrene to produce the grafted latex coatings of the present invention. Proper selection of latices used in conjunction with the brominated aromatic monomer enables production of flame retardant coatings useful in a wide range of applications. As used herein, the term "coatings" is used in a broad sense and is intended to include applications to a substrate, both as a laminate or as an interstitial filler. For example, included are uses as textile backcoatings for woven upholstery and draperies, carpet backing, non-woven filter media binders, paints, adhesives, caulks, sealants and the like, applied to the variety of suitable substrates.

The coatings of the present invention contain a latex to which is grafted ring-brominated aromatic monomers. The flame retardant, graft latex copolymer has the formula:

$$\overset{L}{\underset{(S)_n}{|}}$$

wherein n is $>1$, L is a natural or synthetic latex, and each S is a grafted-on side chain comprising a ring-brominated aromatic monomeric unit. The ring-brominated aromatic monomer units have the formula (I):

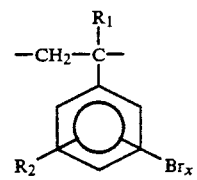

in which $X=1$ to 4, $R_1$ is —H or —CH$_3$, and $R_2$ is —H or an alkyl group having from 1 to 4 carbon atoms. Representative ring-halogenated aromatic monomers are styrene, methylstyrene, α-methylstyrene, α-methyl methylstyrene, ethylstyrene or α-methyl ethylstyrene, each with bromine substitution (mono, di, tri and tetra) in the phenyl nucleus. Mixtures or mixed isomers of the above monomers may also be used. As discussed more fully hereafter, the preferred ring-brominated aromatic monomer is polybrominated styrene, with dibromostyrene being most preferred. A preferred dibromostyrene material is one having at least about 82% of the monomeric units with X=2, available from Great Lakes Chemical Corporation of West Lafayette, Ind., which material normally also contains about 15 percent monobromostyrene and 3 percent tribromostyrene by weight.

Graft polymerization of a commercial latex will typically result in grafted latex copolymer and homopolymer of the brominated aromatic monomer. It has been found that the grafted latex and homopolymer latex of the brominated aromatic monomer remain well intermixed. The homopolymer could alternatively be removed, but this is not necessary and the preferred composition, therefore, includes grafted latex copolymer and homopolymer of the brominated aromatic monomer.

In one aspect of the present invention, the ring-brominated aromatic monomer is grafted to the latex coating in an amount to provide sufficient bromine to yield the desired flame retardancy, typically at least about 1% bromine by weight of the graft latex. In this respect, the ring-brominated monomer is typically included in an amount to provide from 6 to 36 percent bromine by weight of the overall composition. More preferably, the ring-brominated monomer is included in an amount to give from 9 to 24 percent bromine by weight.

In another aspect of the invention, it has been determined that it is preferable to utilize polybrominated forms of the ring-brominated aromatic monomer. This minimizes the number of ring-brominated monomer units required to achieve a given bromine weight percent of the overall composition. The use of a lower percentage of ring-brominated monomer units minimizes any adverse impact which such units would otherwise have on the physical properties of the latex coating. It is therefore an aspect of the present invention that the ring-brominated aromatic monomer units include polybrominated units, and that the ring-brominated monomer units include an average of at least about 1.5 bromines per unit. In a preferred embodiment, at least about 80% of the brominated monomeric units have formulas in which X=2. For coatings containing monobrominated forms of the ring-brominated aromatic monomer units, it is typically preferred that at most about 20% of the ring-brominated aromatic monomer units be monobrominated.

At the same time, it is desirable that the latex compositions used for the coatings be readily prepared. Highly brominated, ethylenically unsaturated, aromatic monomers, such as pure tetrabromostyrene, are not liquid at room temperature, and this interferes with the ready preparation of the graft latices. It is therefore preferred that the ratio of monobrominated and polybrominated monomer units in the latex be such that the corresponding mixture of the unsaturated ring-brominated aromatic monomers is liquid at room temperature. For example, a preferred material for use in the preparation of the coatings of the present invention is the previously identified dibromostyrene composition as produced by Great Lakes Chemical Corporation, which composition is liquid at room temperature and comprises a mixture of 15 percent monobromostyrene, 82 percent dibromostyrene and 3 percent tribromostyrene. Other mono- and polybrominated aromatic monomer mixtures which are liquid at room temperature are similarly preferred for preparation of the present latex coatings. The mixtures preferably include as high an overall percentage of bromine as possible while still being a liquid at room temperature.

The present invention utilizes one or more natural or synthetic latices, including, but not limited to, acrylic, styrene-butadiene, vinyl acetate-vinyl versatate 10, styrene-acrylic, vinyl acetate-acrylic, vinyl acetate-acrylic-ethylene, polybutadiene, natural latex, polyisoprene, neoprene, ethylene-vinyl acetate, and ethylene-vinyl chloride - a third monomer (amide).

The final latex may consist of a ring-brominated aromatic monomer, as described previously, grafted to one or more latices, or of a blend of such a brominated latex or latices and one or more other latices not so brominated. The brominated latex or latices may be in any proportion to the non-brominated latex or latices. The prime factor to be considered in the choice of a latex or a latex mixture to be grafted is the glass transition temperature(s) of the polymer(s) in the final latex desired. This is the characteristic temperature at which the system undergoes a change from a hard, brittle material to a softer, more flexible one. Since polymers are generally unable to form films from latices at temperatures below the Tg, an obvious requirement is that the polymer be above the Tg at the application and use temperature. A further restriction is placed on the Tg of the polymer hy the fact that polymers become very soft at temperatures too far above the Tg, resulting in poor hardness, blocking, abrasion resistance, dirt collection, and so on. A balance must be obtained, therefore, between the good flexibility, adhesion, coalescence, and so forth, obtained at temperatures further above the Tg and the good mechanical resistance properties found closer to the Tg. This is generally accomplished in coatings intended for ambient use by using polymers having Tg's below 35° C.

Advantageously, the coatings of the present invention may be prepared and applied by conventional methods. For example, latices are prepared by introducing one or more emulsifiers to a natural or synthetic latex or blend of latices. A ring-brominated aromatic monomer, a suitable redox initiator and, optionally, a chain-transfer agent and/or water are added. The resulting graft latex is then used alone as a coating or modified by blending with another latex or latices.

Suitable initiators include the initiators used for free radical polymerization such as organic peroxides, hydroperoxides, azo or diazo compounds, persulfates, redox systems such as hydrogen peroxide-ferrous iron, persulfate redox systems, oil-soluble peroxygen compounds with ferrous iron, hydroperoxide-polyamine systems and others. Suitable emulsifiers include anionic, cationic, nonionic or amphoteric emulsifiers. Useful chain transfer agents include aliphatic, aryl mercaptans and disulfides, $CCl_4$, $CBr_4$, $CHI_3$ and $CHCl_3$, etc. Among these, mercaptans are preferred.

Polymerization may be carried out in the presence of air. Faster reactions are observed in the absence of oxygen at temperatures ranging from −30° to 110° C., with preferred temperatures ranging from about 0° C. to about 90° C.

The polymer latices are then applied in conventional fashion to yield fire retardant fabric backcoatings, paints, adhesives, sealants, caulking, non-woven binders, etc. Latex selection is based upon the final application of the coating. Criteria include the glass transition temperature (Tg), film physical properties and chemical resistance desired.

The flame retardant latices used in the present invention may be admixed with other latex compositions, including non-flame retardant latices, to provide coatings having enhanced properties. In particular, the combination of the flame retardant latices used herein with other non-brominated latices will yield coatings having improved flame retardancy. The latices of the present invention may then be provided with sufficient levels of bromine to yield the desired levels, such as previously indicated, for the resulting combined latices and coatings. Thus, for use in preparing latex blends it is desirable that the graft latex copolymer(s) include sufficient numbers of brominated graft side chains to provide 6 to 60 percent bromine by weight of the graft latex copolymer(s). For coatings from such mixtures, improvement in properties may also be achieved with respect to such aspects as adhesion, film forming, chemical resistance and flexibility.

The following Examples are illustrative and not restrictive in nature. Percents indicated are percents by weight unless indicated otherwise.

EXAMPLES 1-8—Grafting of Dibromostyrene Onto Commercial Latices

A series of dibromostyrene (DBS)-grafted commercial latices was carried out in 8 oz. bottles by emulsion polymerization technique. First, a commercial latex (84.4–40 parts dry basis) was blended with potassium lauroate (3 parts). Dibromostyrene (15.6–60 parts), cumene hydroperoxide (0.2 parts), tetraethylenepentamine (0.4 parts), t-dodecyl mercaptan (0.5 parts) and deionized water (the balance to obtain a final graft latex at about 40–60% solids) were then added. The bottle was sealed under nitrogen, placed in a 50° C. water bath, rotated about a horizontal axis for two to four hours, and cooled to room temperature. The results of these preparations are set forth in Table I. The latices perform well in polyester fabric backcoatings and other aplications and display improved flame retardancy (self-extinguishing rating in MVSS-302 flammability test).

TABLE I

| | Grafting of DBS onto Commercial Latices | | | |
|---|---|---|---|---|
| Example | Commercial Latex[1] | Enduse | Wt. % DBS Charged[2] | MVSS-302 Rating[3] |
| 1 | Rhoplex HA-24 | Textile binder | 30.0 | SE |
| 2 | Rhoplex HA-8 | Acrylic binder | 25.0 | SE |
| 3 | Hystretch V-29 | Textile backcoatings | 40.0 | SE |
| 4 | Airflex 465 | Adhesives | 25.0 | SE |
| 5 | Airflex 4500 | Adhesives | 20.0 | SE |
| 6 | Airflex 4514 | Adhesives | 20.0 | SE |
| 7 | Airflex 4530 | Adhesives | 15.6 | SE |
| 8 | Pliolite SBR | Adhesives, foam | 55.0 | SE |

[1]Rhoplex HA-24 & HA-8 from Rohm & Haas Co.; Hystretch V-29 from B. F. Goodrich Company; Airflex 465, 4500, 4514 and 4530 from Air Products and Chemicals, Inc.; Pliolite SBR latex from Goodyear Tire & Rubber Co.
[2]Weight % DBS based on 100 total solids.
[3]Motor Vehicle Safety Standards (MVSS) 302 flammability test: SE = self-extinguishing.

EXAMPLE 9—Grafting of Dibromostyrene Onto Commercial Latices

Forty parts by weight (dry basis) of a commercially available polybutadiene latex from Goodyear Tire & Rubber Co. was blended in a bottle with an aqueous solution containing one part sodium dodecyl sulfate, 0.2 parts potassium persulfate, 0.2 parts sodium bisulfite and 20 ml deionized water. Sixty parts dibromostyrene and 0.5 parts t-dodecyl mercaptan were added. The bottle was sealed under nitrogen, placed in a 50° C. water bath, rotated about a horizontal axis for 6.5 hours, and cooled to room temperature. The final latex has 59.25% solids. When 3.1 oz./yd$^2$ of this graft latex was coated onto the 8 oz./yd$^2$ fabric, an SE rating was obtained with 0.8–1.0 inch burn length. The commercial latex of this Example without modification as above, failed to pass the MVSS-302 test at this add-on weight and yielded a burn distance of 10.0 inches.

EXAMPLES 10-15–Percent Grafting of Dibromos Onto Commercial Latices

Percent grafting of dibromostyrene onto commercial latices, Pliolite SBR latex and Polybutadiene latex (Goodyear Tire & Rubber Co.) was determined by tetrahydrofuran solvent extraction: the DBS-grafted latex, 55/45-DBS/SBR or 60/40-DBS/polybutadiene, was coagulated in a 1–3% MgSO$_4$ solution under stirring. The coagulated polymer was filtered, washed thoroughly with water, and dried overnight in a vacuum oven at 50° C. to a constant weight. Two grams of the dried coagulated polymer was weighed in a cellulose extraction thimble (43 mm × 123 mm) and successively extracted with tetrahydrofuran for 48 hours. The DBS homopolymer (PDBS) can be extracted by tetrahydrofuran completely. It means that the unextracted PDBS residue should be considered to be grafted onto commercial latex. The percent DBS grafted is given by the weight of grafted (or unextracted) PDBS divided by the weight of DBS charged. There were 30% DBS grafted unto polybutadiene and 60% DBS grafted unto SBR (see Table II).

These results indicate that DBS indeed grafted on commercial latices, Pliolite SBR latex and Polybutadiene latex. However, % DBS grafted depends on reaction

TABLE II

| | | Percent DBS Grafted Unto Commercial Latices | | | | | | | | |
|---|---|---|---|---|---|---|---|---|---|---|
| Example | Charge Ratio DBS/latex | Graft Latex Coagulated g | Br, % | PDBS, % | Extract Wt., g | Br, % | PDBS, g | Unextracted Wt., g | Br, % | graft DBS, g | DBS Grafted* % |
| 10 | SBR latex | 2.004 | — | — | 0.895 | — | — | 1.164 | — | — | — |
| 11 | 55 PDBS/45 SBR latex blend | 1.100 PDBS + 0.900 SBR | — | — | 1.383 | 43.62 | 1.062 | 0.673 | <0.01 | — | — |
| 12 | 55 DBS/45 SBR | 2.000 | 31.67 | 55.74 | 0.726 | 36.75 | 0.469 | 1.273 | 29.23 | 0.655 | 59.5 |

TABLE II-continued

| | | Percent DBS Grafted Unto Commercial Latices | | | | | | | | |
|---|---|---|---|---|---|---|---|---|---|---|
| Example | Charge Ratio DBS/latex | Graft Latex Coagulated | | | Extract | | | Unextracted | | DBS Grafted* |
| | | g | Br, % | PDBS, % | Wt., g | Br, % | PDBS, g | Wt., g | Br, % | graft DBS, g | % |
| 13 | PB latex | 2.003 | — | — | 0.451 | — | — | 1.554 | — | — | — |
| 14 | 60 PDBS/40 PB latex blend | 1.200 PDBS + 0.800 PB | — | — | 1.447 | 39.90 | 1.016 | 0.624 | <0.1 | — | — |
| 15 | 60 DBS/40 PB | 2.000 | 34.34 | 60.44 | 1.117 | 34.35 | 0.707 | 0.893 | 22.85 | 0.359 | 29.9 |

*% DBS grafted = $\frac{\text{wt. of DBS grafted (unto commercial latex)}}{\text{wt. of DBS charged}} \times 100$ For Example 12:

$\frac{29.23}{56.82} \times 100 = 51.4\%$ – % of DBS grafted unto SBR latex in the unextracted portion $1.273 \text{ g} \times 51.4\% = 0.655 \text{ g}$ – wt. of DBS grafted $\frac{0.655}{1.1} \times 100 = 59.5\%$ – % DBS grafted (DBS monomer used contains 56.82 wt. % bromine.)

conditions such as initiator, swelling of polymer latex by monomer, temperature, chain transfer agent, and surfactant.

EXAMPLE 16–Textile Backcoating

Seventy parts by weight (dry basis) of a commercially available acrylic emulsion (Rohm and Haas Rhoplex HA-24) with a Tg of −7° C. consisting of ethyl acrylate, methyl methacrylate and a small quantity of methacrylic acid and N-methylolacrylamide was blended in a bottle with three parts potassium laurate. Thirty parts dibromostyrene, 0.2 parts cumene hydroperoxide, 0.4 parts tetraethylenepentamine, 0.5 parts t-dodecyl mercaptan, and 57.3 parts water were added. The bottle was sealed under nitrogen, placed in a 50° C. water bath, and rotated about a horizontal axis for three hours. The resultant latex was cooled and coated onto an 8-oz./yd² 100% polyester fabric at a weight of 1.6 oz./yd², after oven drying at 100° C. for thirty minutes. The coating was clear and had a hand only slightly firmer than the commercial latex, which is considered satisfactory. The coated fabric passed MVSS-302 flammability test with an SE (best rating) and a burn distance of 0.8 inches. The same fabric backcoated with 1.6 oz./yd² of the commercial latex failed the MVSS-302 test with a burn distance of 10.0 inches.

EXAMPLE 17—Textile Backcoating

Seventy parts by weight (dry basis) of a commercially available nonionic self-crosslinking polymer latex (Rohm and Haas Rhoplex HA-8) with a Tg of −10° C. was blended with three parts potassium laurate. Thirty parts dibromostyrene, 0.2 parts cumene hydroperoxide, 0.4 parts tetraethylenepentamine, 0.5 parts t-dodecyl mercaptan, and 40.8 parts of water were then added. The bottle was sealed under nitrogen, placed in a 50° C. water bath, rotated about a horizontal axis for four hours, and cooled to room temperature. When 1.4 oz./yd² of this graft latex was coated onto the 8 oz./yd² fabric, an SE rating was obtained with a 1.4 inch burn length. The commercial latex of this Example alone failed to pass the MVSS-302 test at this add-on weight and yielded a burn distance of 10.0 inches.

EXAMPLE 18—Textile Backcoating

A first latex was prepared by charging 103 parts by weight of water, 3 parts sodium dodecyl sulfate, 0.3 parts potassium persulfate, 0.3 parts sodium bisulfite, 21 parts ethyl acrylate, 19 parts acrylonitrile and 60 parts butyl acrylate into a bottle. The bottle was purged with N₂, capped, and placed in a 50° C. water bath and rotated about a horizontal axis for 16 hours.

A total of 60 parts by weight (dry basis) of this first latex was added to another bottle along with three parts potassium laurate. After shaking thoroughly and being allowed to sit 30 minutes, 10 parts styrene, 30 parts dibromostyrene, 0.42 parts cumene hydroperoxide, 0.7 parts Na₄P₂O₇ parts FeSO₄, and 36 parts H₂O were added and allowed to react for three hours at 50° C.

When coated onto an 8-oz./yd², 100% polyester fabric, the first latex at 3.7 oz./yd² yielded a failure in the MVSS-302 test (10.0 inches burned). The latex with dibromostyrene grafted on produced a 1.6-inch burn length at 3.7 oz./yd². The graft latex had good flexibility, yet was slightly firmer than the latex to which dibromostyrene was not grafted.

EXAMPLE 19–Contact Adhesive

Three parts by weight of potassium laurate was dissolved in 80 parts (dry basis) of a commercially available copolymer latex emulsion based upon ethyl acrylate, acrylonitrile, acrylic acid, and N-methylolacrylamide. To this mixture was added 0.2 parts cumene hydroperoxide, 0.4 parts tetraethylenepentamine, and 0.5 parts t-dodecyl mercaptan. Finally, 20 parts dibromostyrene and 21.4 parts water were added. After reacting in a 50° C. water bath for two hours to reach 50% solids by weight, no visible coagulum was present.

The resultant latex was coated onto 0.5 mil mylar polyester film. After drying 90 seconds at 158° F., two pieces of film were pressed together and rolled to eliminate any bubbles.

Upon cooling, adhesion was judged to be adequate. Flammability was tested by wrapping the film composite loosely about a 4 inch diameter cylinder of fiberglass batt insulation. A 3 inch blue methane bunsen burner flame was placed against the lower and side surfaces of the batt/mylar construction which had been positioned at a 45 degree angle from vertical. There was no observable after flame when the burner flame was removed after 10–15 seconds of contact.

A similar construction utilizing the commercially available latex emulsion without dibromostyrene grafted to it was also tested for flammability. When the burner flame was removed after 10–15 seconds, flaming of the substrate continued until extinguished about a minute later with water.

EXAMPLE 20–Latex Binder

To 54 parts by weight (dry basis) of a commercially available latex emulsion consisting of a terpolymer of ethylene, vinyl chloride, and a third monomer which imparts amide functionality to the polymer was added 3 parts potassium lauroate, 0.2 parts cumene hydroperoxide, 0.4 parts tetraethylenepentamine, and 0.5 parts t-dodecyl mercaptan. Ten parts dibromostyrene and 14 parts water were then added. The resultant blend was placed in a 50° C. water bath with gentle agitation and reacted to about 58% solids in 2 hr 20 min. The resultant latex was free of coagulum.

A non-woven polyester fiber filter medium weighing about 1.25 oz./yd$^2$ was immersed in the latex. Upon drying at 300° F. for 90 seconds, the weight of the bonded fiber increased to 2.4 oz./yd$^2$. A second sample of non-woven polyester fiber filter was immersed in the commercially available latex emulsion to which dibromostyrene had not been grafted. Upon drying, the bonded fiber weighed 2.3 oz./yd$^2$.

Both bonded fiber samples were tested for flammability by exposure to a 4 inch high, 1950° F. propane flame from a Fisher Burner. The filter media were held 2-½ inches over the top of the burner at a 15° angle from horizontal.

The sample which was not bound with latex to which dibromostyrene was grafted burned the entire twelve inch length. The sample containing dibromostyrene graft latex burned between eight and nine inches prior to self-extinguishing.

EXAMPLE 21–Latex Sealant

Two latex sealants were prepared. The first was prepared by charging 125 parts by weight water, 2 parts sodium dodecyl sulfate, 0.2 parts t-dodecyl mercaptan, and 0.3 parts potassium persulfate. Upon mixing, 95 parts ethyl acrylate, 3 parts acrylonitrile, and 2 parts acrylic acid were added. The bottle was sealed under nitrogen, and rotated about a horizontal axis slowly for 16 hours in a 50° C. water bath.

The second was prepared by charging the following to the first latex preparation (80 parts dry weight): 3.5 parts potassium lauroate, 0.2 parts cumene hydroperoxide, 0.4 parts tetraethylenepentamine, 0.5 parts t-dodecyl mercaptan, 20 parts dibromostyrene and 20 parts water. The blend was allowed to react at 50° C. to about 47% solids in 2 hr.

To 100 parts of each of the two latices above were added 2 parts Triton X-405 (Rohm and Haas), 23 parts benzyl butyl phthalate, 4 parts Varsol #1 (Exxon), 2.5 parts ethylene glycol, 2 parts Composition T dispersant (Calgon), 120 parts calcium carbonate (2 micron avg. particle size), and 2.5 parts titanium oxide.

Both caulks show good adhesion to substrates including wood, glass, and concrete.

The flammability of each was tested by placing a bead of caulk ¼ inch in diameter on a ½ inch wide strip of asbestos cement board. The caulk was subjected to the Butler chimney flammability test (ASTM D-3014).

The first caulk, which did not contain dibromostyrene grafted to the latex, burned the full 250 mm of the test specimen. The caulk containing dibromostyrene burned less than 160 mm.

EXAMPLE 22—Latex Paint

A pressure bottle was charged with an aqueous solution of 0.12 parts by weight ammonium persulfate, 0.16 parts sodium bisulfite and 113.51 parts water, and a solution of 7.6 Parts Triton X-207 (Rohm and Haas Co.), 30 parts styrene, 68 parts butyl acrylate, and 2 parts methacrylic acid. The bottle was placed in a 65° C. water bath for 4 hours while rotating about a horizontal axis.

The resulting latex (original) was cooled and strained. Eighty parts (dry basis) weight of this latex was transferred to a second bottle and three parts potassium lauroate were added. The bottle was then charged with 0.2 parts cumene hydroperoxide, 0.4 parts tetraethylenepentamine, and 0.5 parts t-dodecyl mercaptan. An additional 18.6 parts water and 20 parts dibromostyrene were then added. This bottle was placed in a 50° C. water bath and agitated gently for two hours.

In an open vessel with continuous high shear mixing, 40 Parts by weight water, 0.15 parts antifoaming agents, dispersants and surfactants Tamol 731 (0.4 parts), Triton X-207 (0.28 parts), and Silwet L-7602 (0.28 parts) (Tamol and Triton are products of Rohm and Haas, Silwet is a product of Union Carbide), 0.62 parts sodium polyacrylate thickener, 18 parts titanium dioxide, 28.3 parts calcium carbonate, and 7.34 parts 1-butanol were added. Mixing speed was then reduced, and 50 parts latex was added. An additional 4.6 parts water, 1.15 parts methyl cellosolve, and 3 parts sodium polyacrylate thickener were then added. Composition A contained the original latex without dibromostyrene grafted on; composition B contained latex with dibromostyrene.

Paint compositions A and B had good adhesion and film forming properties. Each was used to coat a 1 mil mylar film to a 10 mil wet thickness. The dry film measured about 3 mils. The dry film/mylar was tested by the limiting oxygen index test (ASTM D-2863). Composition A without dibromostyrene had a limiting oxygen index of 22. Composition B with dibromostyrene had an oxygen index of 24, a significant improvement in flame retardancy.

EXAMPLE 23—Alternate Latex Coatings

Repetition of the foregoing examples with alternate natural and/or synthetic latices provides similar results, with the graft latex displaying improved flame retardancy and maintaining suitable other physical properties. The Examples 16–22 are reproduced using a wide range of natural and synthetic latices, including acrylic, styrene-butadiene, vinyl acetate-vinyl versatate 10, styrene-acrylic, vinyl acetate-acrylic, vinyl acetate-acrylic-ethylene, polybutadiene, natural latex, polyisoprene, neoprene, ethylene-vinyl acetate, ethylene-vinyl chloride-a third monomer (amide) and mixtures thereof, with similar results being achieved. Further, Examples 16–22 are repeated with the graft latex or latices being blended with non-grafted latex or latices, and the resulting compositions and coatings continue to show improved flame retardancy. Repetition of Examples 16–22 with alternate ring-brominated, ethylenically unsaturated aromatic monomers including styrene, methylstyrene, α-methylstyrene, α-methyl methylstyrene, ethylstyrene and α-methyl ethylstyrene, each with bromine substitution (mono, di, tri and tetra) in the phenyl nucleus also yields similar results.

While the invention has been described in detail in the foregoing description and its specific Examples, the same is to be considered as illustrative and not restrictive in character. It is to be understood that only the preferred embodiments have been described, and that all changes and modifications that come within the spirit of the invention are desired to be protected.

What is claimed is:

1. In a composite material comprising a substrate and a latex coating adhered thereto, the improvement comprising the coating including:

a flame retardant, graft latex copolymer having the formula:

wherein n is >1, L is a natural or synthetic latex, and each S is a grafted-on side chain comprising a brominated monomeric unit of the formula:

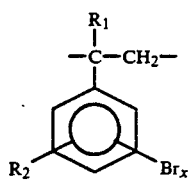

wherein $x=1$ to 4, $R_1$ is H or $CH_3$, and $R_2$ is H or a $C_{1-4}$ lower alkyl group, said graft latex copolymer including at least about 1% bromine by weight of the graft latex copolymer.

2. The improvement of claim 1 in which said graft latex copolymer comprises about 1% to about 60% by weight bromine.

3. The improvement of claim 2 in which said graft latex copolymer is adapted for blending with non-brominated latex and which includes about 6% to about 60% by weight bromine.

4. The improvement of claim 2 in which said graft latex copolymer comprises about 6% to about 36% by weight bromine.

5. The improvement of claim 2 in which said graft latex copolymer comprises about 9% to about 24% by weight bromine.

6. The improvement of claim 1 in which $R_1$ and $R_2$ are each hydrogen.

7. The improvement of claim 1 in which at least about 80% of said brominated monomeric units have formulas wherein $x=2$.

8. The improvement of claim 1 in which at least about 85% of said brominated monomeric units have formulas wherein $x=2$, 3 or 4.

9. The improvement of claim 1 in which said brominated monomeric units include an average of at least about 1.5 bromines per unit.

10. The improvement of claim 1 in which said natural or synthetic latex L is selected from the group consisting of acrylic, styrene-butadiene, vinyl acetate-vinyl versatate 10, styrene-acrylic, vinyl acetate-acrylic, vinyl acetate-acrylic- ethylene, polybutadiene, natural latex, polyisoprene, neoprene, ethylene-vinyl acetate, ethylene-vinyl chloride-a third monomer (amide) and mixtures thereof.

11. The improvement of claim 1 in which said coating is selected from the group consisting of textile backcoating, carpet backing, non-woven fiber filter media binder, paint, adhesive, caulk and sealant.

12. The improvement of claim 1 in which said coating further includes a homopolymer of said brominated monomeric units, said graft latex copolymer and said homopolymer together including at least about 1% bromine by weight of said coating.

13. The improvement of claim 1 in which said coating further includes non-grafted natural or synthetic latex other than the grafted latex.

14. The improvement of claim 13 in which said grafted latex copolymer includes about 6% to about 60% bromine by weight of the grafted latex copolymer.

15. The improvement of claim 13 in which said coating comprises about 6% to about 36% bromine by weight of said coating.

16. The improvement of claim 15 in which said coating comprises about 9% to about 24% bromine by weight of said coating.

17. The improvement of claim 13 in which $R_1$ and $R_2$ are each hydrogen.

18. The improvement of claim 13 in which said coating further includes a homopolymer of said brominated monomeric units, said graft latex copolymer and said homopolymer together including at least about 1% bromine by weight of said coating.

19. The improvement of claim 13 in which the non-grafted natural or synthetic latex is selected from the group consisting of acrylic, styrene-butadiene, vinyl acetate-vinyl versatate 10, styrene-acrylic, vinyl acetate-acrylic, vinyl acetate-acrylic-ethylene, polybutadiene, natural latex, polyisoprene, neoprene, ethylene-vinyl acetate, ethylene-vinyl chloride-a third monomer (amide) and mixtures thereof.

20. The improvement of claim 13 in which said coating is selected from the group consisting of textile backcoating, carpet backing, non-woven fiber filter media binder, paint, adhesive, caulk and sealant.

21. A composite material comprising:
a. a substrate adapted to be coated; and
b. a coating adhered to said substrate, said coating comprising a flame retardant, graft latex copolymer having the formula:

wherein n is >1, L is a natural or synthetic latex, and each S is a grafted-on side chain comprising a brominated monomeric unit of the formula:

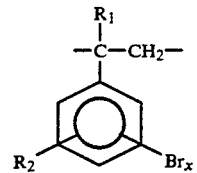

wherein $x=1$ to 4, $R_1$ is H or $CH_3$, and $R_2$ is H or a $C_{1-4}$ lower alkyl group, said graft latex copolymer including at least about 1% bromine by weight of the graft latex copolymer.

22. The composite material of claim 21 in which said graft latex copolymer comprises about 1% to about 60% by weight bromine.

23. The composite material of claim 22 in which said graft latex copolymer includes about 6% to about 60% bromine by weight of said graft latex copolymer.

24. The composite material of claim 22 in which said graft latex copolymer comprises about 6% to about 36% by weight bromine.

25. The composite material of claim 22 in which said graft latex copolymer comprises about 9% to about 24% by weight bromine.

26. The composite material of claim 21 in which $R_1$ and $R_2$ are each hydrogen.

27. The composite material of claim 21 in which at least about 80% of said brominated monomeric units have formulas wherein x=2.

28. The composite material of claim 21 in which at least about 85% of said brominated monomeric units have formulas wherein x=2, 3 or 4.

29. The composite material of claim 21 in which said brominated monomeric units include an average of at least about 1.5 bromines per unit.

30. The composite material of claim 21 in which said natural or synthetic latex L is selected from the group consisting of acrylic, styrene-butadiene, vinyl acetate-vinyl versatate 10, styrene-acrylic, vinyl acetate-acrylic, vinyl acetate-acrylic-ethylene, polybutadiene, natural latex, polyisoprene, neoprene, ethylene-vinyl acetate, ethylene-vinyl chloride-a third monomer (amide) and mixtures thereof.

31. The composite material of claim 21 in which said coating further includes a homopolymer of said brominated monomeric units, said graft latex copolymer and said homopolymer together including at least about 1% bromine by weight of said coating.

32. The composite material of claim 21 in which said coating further includes non-grafted natural or synthetic latex other than the grafted latex copolymer.

33. The composite material of claim 32 in which said grafted latex copolymer includes about 6% to about 60% bromine by weight of the grafted latex copolymer.

34. The composite material of claim 32 in which said coating comprises about 9% to about 24% bromine by weight of said coating.

* * * * *

UNITED STATES PATENT AND TRADEMARK OFFICE
CERTIFICATE OF CORRECTION

PATENT NO. : 5,296,306
DATED : March 22, 1994
INVENTOR(S) : Jin-liang Wang et al.

It is certified that error appears in the above-identified patent and that said Letters Patent is hereby corrected as shown below:

In column 4, line 25, change "hy" to -- by --.

In column 5, line 39, change "aplications" to -- applications --.

In column 6, in footnote numbered 2 to Table I, change "100" to -- 100% --

In column 6, line 29, change "Example" to -- Example, --.

In column 6, line 32, change "Dibromos" to -- Dibromostyrene --.

In column 8, line 23, change "$Na_4P_2O_7 parts$" to -- $Na_4P_2O_7$, 0.01 parts --.

In column 10, line 59, change "foregoining" to -- foregoing --.

Signed and Sealed this

Ninth Day of August, 1994

Attest:

BRUCE LEHMAN

Attesting Officer     Commissioner of Patents and Trademarks